(12) United States Patent
Ming et al.

(10) Patent No.: US 10,328,379 B2
(45) Date of Patent: Jun. 25, 2019

(54) FILTRATION LIQUID TANK FOR DEDUSTING DEVICE, AND DEDUSTING DEVICE WITH THE SAME

(71) Applicant: Midea Group Co., Ltd., Foshan (CN)

(72) Inventors: Lele Ming, Foshan (CN); Hui Zhang, Foshan (CN); Jizhe Zhang, Foshan (CN); Qian Xu, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/307,961

(22) PCT Filed: May 30, 2016

(86) PCT No.: PCT/CN2016/083953
§ 371 (c)(1),
(2) Date: Oct. 31, 2016

(87) PCT Pub. No.: WO2017/101255
PCT Pub. Date: Jun. 22, 2017

(65) Prior Publication Data
US 2018/0272264 A1     Sep. 27, 2018

(30) Foreign Application Priority Data

Dec. 15, 2015  (CN) .......................... 2015 1 0940472

(51) Int. Cl.
*B01D 45/16* (2006.01)
*B01D 47/02* (2006.01)
*B01D 50/00* (2006.01)

(52) U.S. Cl.
CPC .......... *B01D 50/002* (2013.01); *B01D 45/16* (2013.01); *B01D 47/021* (2013.01); *B01D 47/025* (2013.01); *B01D 2247/101* (2013.01)

(58) Field of Classification Search
CPC ...... B01D 45/16; B01D 47/02; B01D 47/025; B01D 50/002
See application file for complete search history.

(56) References Cited

U.S. PATENT DOCUMENTS

| 4,347,067 | A | 8/1982 | Homer |
| 5,192,344 | A | 3/1993 | House |
| 2008/0092327 | A1 | 4/2008 | Yarbrough |

FOREIGN PATENT DOCUMENTS

| CN | 1692869 A | 11/2005 |
| CN | 1977747 A | 6/2007 |

(Continued)

OTHER PUBLICATIONS

Chinese Application No. 201510940472.X First Office Action dated Oct. 8, 2016, 6 pages.

(Continued)

*Primary Examiner* — Cabrena Holecek
(74) *Attorney, Agent, or Firm* — Kilpatrick Townsend & Stockton, LLP

(57) ABSTRACT

A filtration liquid tank (100) for a dedusting device and a dedusting device with the same are provided. The filtration liquid tank (100) includes a tank body (1) formed with an inlet and an outlet; a cyclone separator (3) disposed within the tank body (1) and in communication with the outlet, defining a cyclone separation chamber therein, and formed with a cyclone inlet (31) in communication with the cyclone separation chamber; and a water pressing assembly (2) disposed within the tank body (1) and in communication with the inlet, and configured to guide an airstream entering from the inlet towards a filtration medium and produce a circumferential motion, the airstream filtered by the filtration medium being exhausted from the outlet.

20 Claims, 6 Drawing Sheets

(56) References Cited

FOREIGN PATENT DOCUMENTS

| | | |
|---|---|---|
| CN | 102600691 A | 7/2012 |
| CN | 105597460 A | 5/2016 |
| EP | 1625882 A1 | 12/2006 |
| WO | 2010085050 A2 | 7/2010 |
| WO | WO-2010085050 A2 * 7/2010 ........... A47L 9/1625 |

OTHER PUBLICATIONS

Chinese Application No. 201510940472.X English Translation of the First Office Action dated Oct. 8, 2016, 7 pages.
Chinese Application No. 201510940472.X Second Office Action dated Mar. 28, 2017, 4 pages.
Chinese Application No. 201510940472.X English Translation of the Second Office Action dated Mar. 28, 2017, 7 pages.
PCT/CN2016/083953 International Search Report & Written Opinion with brief English translation, dated Sep. 19, 2016.

* cited by examiner

FILTRATION LIQUID TANK FOR DEDUSTING DEVICE, AND DEDUSTING DEVICE WITH THE SAME

CROSS-REFERENCE TO RELATED APPLICATION

The present application is a national phase entry under 35 U.S.C. § 371 of International Application PCT/CN2016/083953, filed May 30, 2016, which claims the benefit of and priority to Chinese Patent Application No. 201510940472.X, filed Dec. 15, 2015, the entire disclosures of which are incorporated herein by reference.

FIELD

The present invention relates to a technical field of household appliances, and more particularly to a filtration liquid tank for a dedusting device and a dedusting device with the same.

BACKGROUND

In the related art, a filtration liquid tank for a dedusting device is usually provided with a water baffle structure therein as a preliminary barrier against sewage, and provided with a filtration sponge within an outlet of the filtration liquid tank to prevent water droplets from entering a downstream motor. However, a gas-liquid separation effect at the outlet is poor, so a small number of water droplets enter the downstream motor, resulting in safety hazard.

SUMMARY

The present invention aims to solve at least one of the problems existing in the related art. Thus, an objective of the present invention is to provide a filtration liquid tank for a dedusting device, which has a simple structure and a good filtration effect.

Another objective of the present invention is to provide a dedusting device with the above filtration liquid tank.

According to a first aspect of the present invention, the filtration liquid tank includes: a tank body formed with an inlet and an outlet; a cyclone separator disposed within the tank body and in communication with the outlet, defining a cyclone separation chamber therein, and formed with a cyclone inlet in communication with the cyclone separation chamber; and a water pressing assembly disposed within the tank body and in communication with the inlet, and configured to guide an airstream entering from the inlet towards a filtration medium and produce a circumferential motion, the airstream filtered by the filtration medium being exhausted from the outlet.

For the filtration liquid tank according to embodiments of the present invention, by disposing the water pressing assembly and the cyclone separator within the filtration liquid tank, the airstream entering from the inlet of the tank body produces the circumferential motion, which lowers the flow velocity of the airstream to fully mix the airstream with the filtration medium in the tank body and hence improve the filtration effect, and the cyclone separator separates the gas-liquid mixture flowing towards the outlet to further improve the gas-liquid separation effect.

Moreover, the filtration liquid tank according to embodiments of the present invention may have the following additional technical features.

In some embodiments of the present invention, the cyclone separator is configured in such a manner that the airstream entering the cyclone separation chamber through the cyclone inlet rotates in the same direction as the rotation of the airstream flowing through the water pressing assembly.

Specifically, the water pressing assembly includes an inlet pipe and a water pressing plate; the inlet pipe has a first end in communication with the inlet of the tank body and a second end; the water pressing plate is formed with a water pressing hole penetrating the water pressing plate; and the second end of the inlet pipe is connected with an upper surface of the water pressing plate and communicates with the water pressing hole.

Further, the water pressing assembly further includes at least one vane connected to a lower surface of the water pressing plate. Specifically, the vane is configured as a smooth curved surface, and extends from the inside out with respect to a center of the water pressing hole.

Alternatively, a plurality of vanes is provided and spaced apart from one another in a circumferential direction of the water pressing hole.

Specifically, a distance between two adjacent vanes increases gradually from the inside out with respect to the center of the water pressing hole.

Alternatively, the vane is disposed in a non-parallel manner with respect to the water pressing plate.

In some other embodiments of the present invention, the water pressing plate is formed with a plurality of ditch-shaped water pressing troughs radiating from the water pressing hole to the surrounding and extending curvedly.

Specifically, the plurality of water pressing troughs is spaced apart from one another in the circumferential direction of the water pressing hole.

Alternatively, width of each water pressing trough increases gradually from the inside out with respect to the center of the water pressing hole.

Specifically, an extension direction of each water pressing trough deviates from a radial direction of the water pressing hole from the inside out.

In some embodiments of the present invention, the water pressing hole is formed in the center of the water pressing plate.

Specifically, the water pressing plate is disposed horizontally with respect to a bottom wall of the tank body.

Alternatively, the first end of the inlet pipe is detachably connected with the tank body.

Alternatively, the second end of the inlet pipe and the water pressing plate are integrally molded.

In some embodiments of the present invention, the cyclone inlet extends tangentially along a side wall of the cyclone separator.

Specifically, the cyclone inlet is formed in an upper part of the cyclone separator.

In some embodiments of the present invention, at least part of the cyclone separation chamber is configured as a structure with a sectional area decreasing gradually from the top down.

Alternatively, the at least part of the cyclone separation chamber is a lower part of the cyclone separator.

Further, a communicating port is formed in a bottom of the cyclone separator and penetrates the bottom of the cyclone separator, and a float is provided in the cyclone separator to close the communicating port in a normally closed state.

Specifically, an outlet pipe is provided at the outlet, an end of the outlet pipe extends into the cyclone separation chamber, and the float is suitable to close the end of the outlet pipe when the float opens the communicating port.

Specifically, the tank body includes: a body having an open top, and an upper cover plate disposed on the top of the body, the cyclone separator being disposed to the upper cover plate.

In some embodiments of the present invention, a top of the cyclone separation chamber is open, and the tank body further includes an outlet cover plate disposed on the upper cover plate and closing the top of the cyclone separation chamber, in which the outlet is formed in the outlet cover plate, and the outlet cover plate and the upper cover plate are detachably connected.

A dedusting device according to a second aspect of embodiments of the present invention includes the filtration liquid tank according to the first aspect of embodiments of the present invention. For the dedusting device according to embodiments of the present invention, by providing the filtration liquid tank, the overall performance of the dedusting device is improved.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of the present invention will become apparent and more readily appreciated from the following descriptions made with reference to the drawings, in which.

REFERENCE NUMERALS

100: filtration liquid tank

Figure 1:
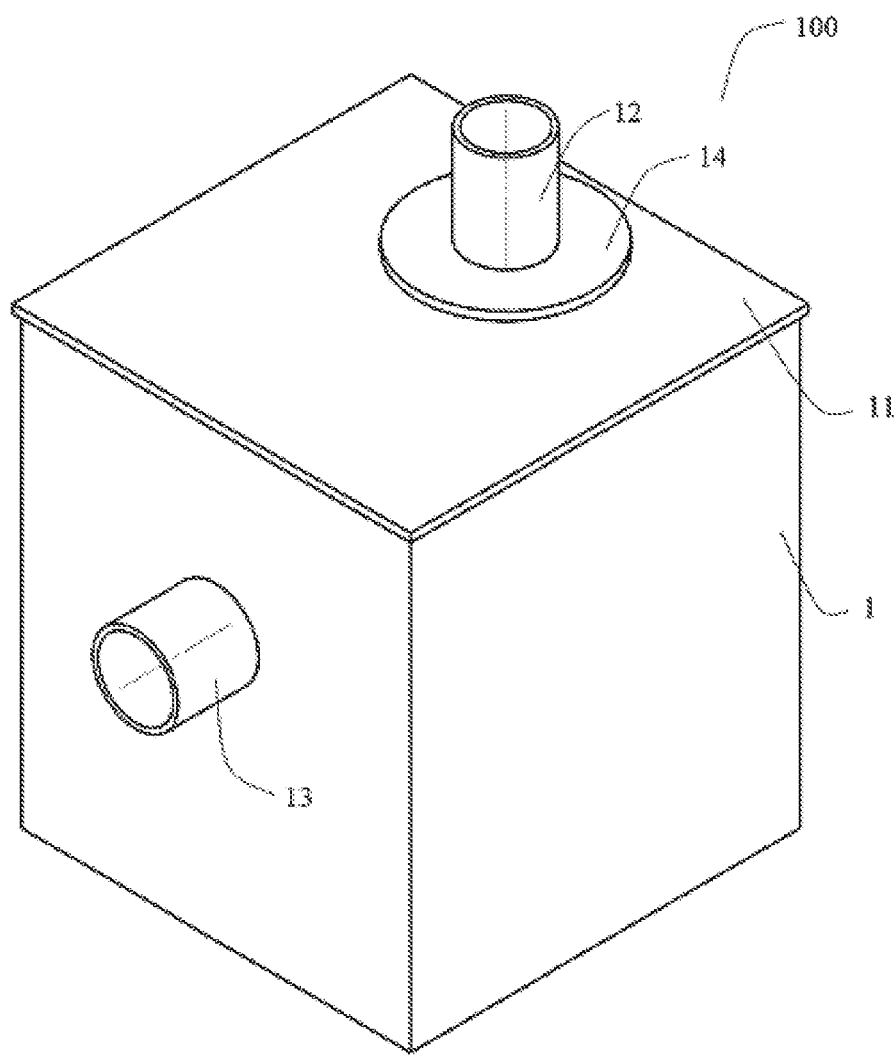
FIG. 1 is a perspective view of a filtration liquid tank for a dedusting device according to an embodiment of the present invention.

1: tank body, 11: upper cover plate, 12: outlet pipe, 13: connection pipe, 14: outlet cover plate;

2: water pressing assembly, 21: inlet pipe, 211: limiting ring, 22: water pressing plate, 221: water pressing hole, 23: vane, 24: water pressing trough;

3: cyclone separator, 31: cyclone inlet, 32: communicating port;

4: float

DETAILED DESCRIPTION

Embodiments of the present invention will be described in detail and examples of the embodiments will be illustrated in the drawings, where same or similar reference numerals are used to indicate same or similar members or members with same or similar functions. The embodiments described herein with reference to drawings are explanatory, which are used to illustrate the present invention, but shall not be construed to limit the present invention.

In the specification, unless specified or limited otherwise, relative terms such as "central", "upper", "lower", "front", "rear", "left", "right", "vertical", "horizontal", "top", "bottom" "inner" and "outer" should be construed to refer to the orientation as then described or as shown in the drawings under discussion. These relative terms are for convenience of description and do not require that the present disclosure be constructed or operated in a particular orientation, and thus shall not be construed to limit the present invention.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the following, a filtration liquid tank 100 for a dedusting device according to embodiments of the present invention will be described with reference to FIGS. 1 to 6.

Figure 2:
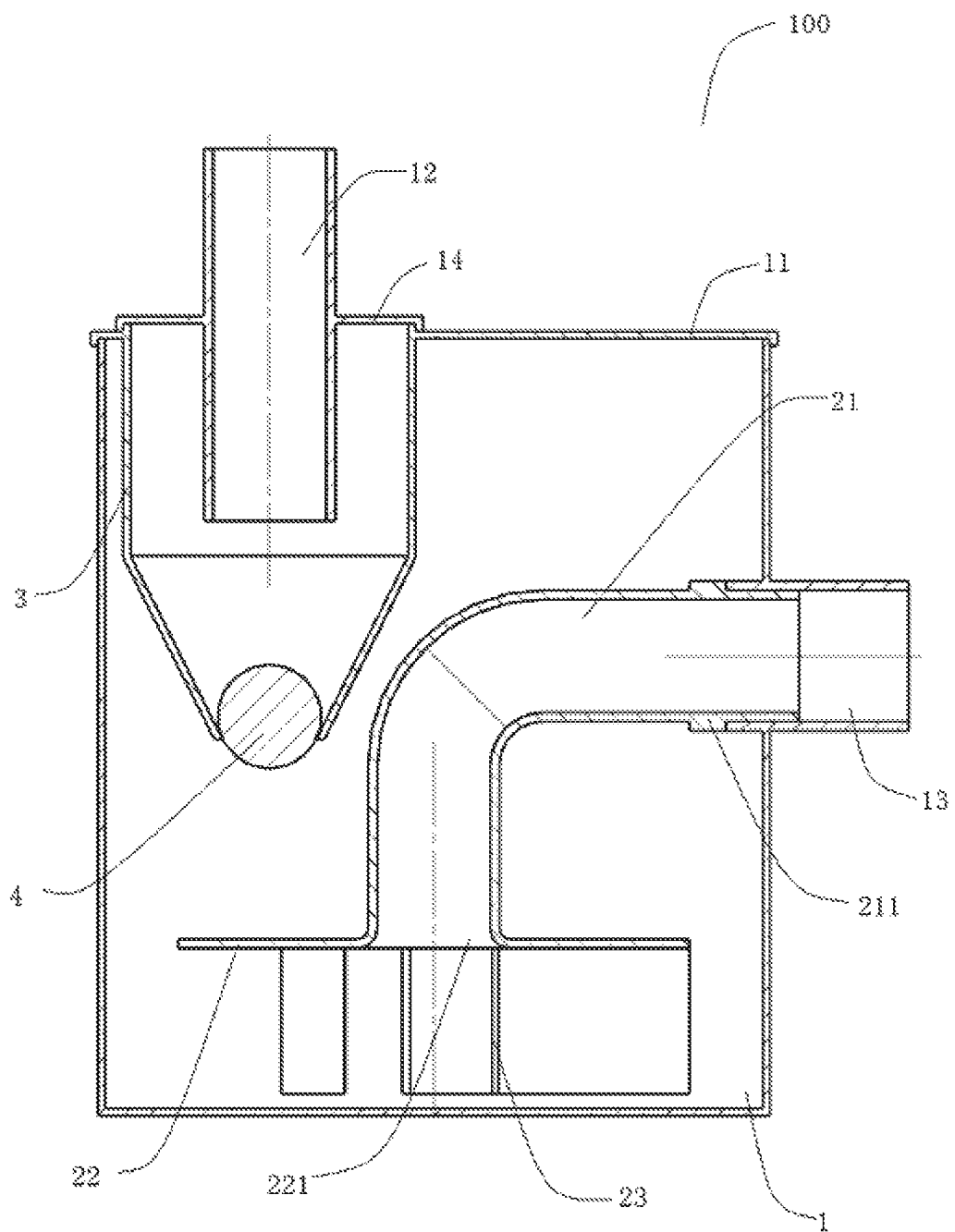
FIG. 2 is a sectional view of the filtration liquid tank shown in FIG. 1.
Figure 3:
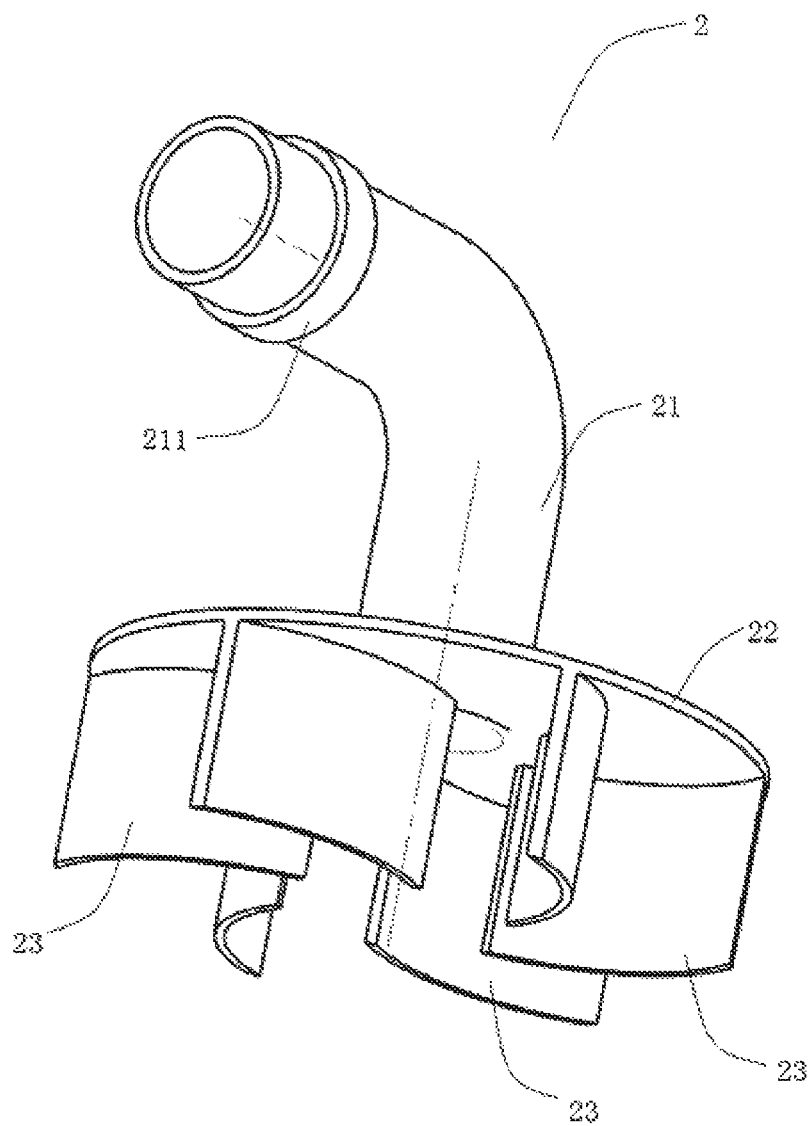
FIG. 3 is a perspective view of a water pressing assembly shown in FIG. 2.
Figure 4:
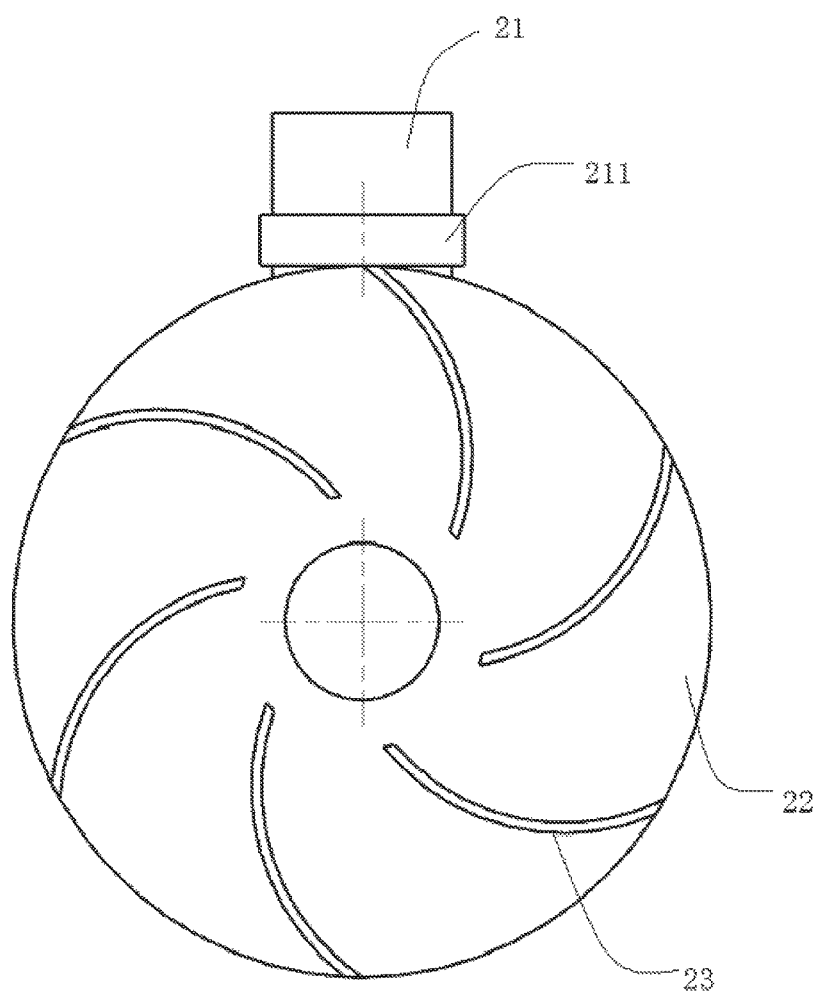
FIG. 4 is a bottom view of the water pressing assembly shown in FIG. 3.

As shown in FIGS. 1 and 2, the filtration liquid tank 100 according to embodiments of the present invention includes a tank body 1, a water pressing assembly 2 and a cyclone separator 3.

The tank body 1 is formed with an inlet and an outlet. For example, in an embodiment of FIG. 1, the tank body 1 includes a body having an open top, and an upper cover plate 11 disposed at the top of the body. The body of the tank body 1 is substantially configured as a rectangular shape, and certainly, may be configured as other shapes, like a cylindrical shape, which is not defined specifically herein. The inlet may be formed in a side wall of the body, and the outlet may be formed in the upper cover plate 11 of the tank body 1, but both of which are not limited thereby.

Further, as shown in FIG. 2, an outlet pipe 12 is provided at the outlet of the tank body 1, and has a first end (e.g. a lower end in FIG. 2) in communication with an interior of the tank body 1 and a second end (e.g. an upper end in FIG. 2) located outside the tank body 1 and in communication with an exterior of the tank body 1. The tank body 1 has a filtration medium (not shown) which may be water.

The water pressing assembly 2 is disposed within the tank body 1 and in communication with the inlet of the tank body 1; the water pressing assembly 2 is configured to guide an airstream entering from the inlet towards the filtration medium (e.g. water) and produce a circumferential motion, and the airstream filtered by the filtration medium is exhausted from the outlet.

The cyclone separator 3 is disposed within the tank body 1 and in communication with the outlet of the tank body 1; the cyclone separator 3 defines a cyclone separation chamber therein; the cyclone separator 3 is formed with a cyclone inlet 31 in communication with the cyclone separation chamber. The airstream with entrained liquid enters the cyclone separation chamber from the cyclone inlet 31, and undergoes gas-liquid separation under the effect of centrifugal force and gravity, so as to improve the gas-liquid separation effect effectively. For example, in an embodiment of FIG. 5, the cyclone inlet 31 is formed in a lower part of the cyclone separator 3, and preferably extends tangentially along a side wall of the cyclone separator 3, to make it convenient for the airstream to enter the cyclone separation chamber and improve the separation efficiency.

For example, the airstream with entrained dirt enters the tank body 1 from the inlet, and produces the circumferential motion when going through the water pressing assembly 2, so as to reduce a flow velocity of the airstream and increase contact time between the airstream and the water, thus fully mixing the dirt with the water in the tank body 1 and improving the filtration effect. The filtered airstream enters the cyclone separator 3, the liquid is further separated from the airstream under the effect of centrifugal force and gravity, and the separated gas is transported to the outlet of the tank body 1. Thus, the gas-liquid separation effect is improved, thereby effectively protecting a downstream motor located at the outlet of the tank body 1 of the dedusting device, guaranteeing normal operation of the dedusting device, prolonging service life of the dedusting device, and reducing the use cost.

For the filtration liquid tank 100 according to embodiments of the present invention, by disposing the water pressing assembly 2 and the cyclone separator 3 within the filtration liquid tank 100, the airstream entering from the inlet of the tank body 1 produces the circumferential motion, which lowers the flow velocity of the airstream to fully mix the airstream with the filtration medium in the tank body 1 and hence improve the filtration effect, and the cyclone separator 3 separates the gas-liquid mixture flowing towards the outlet to further improve the gas-liquid separation effect.

In some embodiments of the present invention, the water pressing assembly 2 includes an inlet pipe 21 and a water pressing plate 22. Referring to FIG. 2, in combination with FIG. 3, the inlet pipe 21 has a first end and a second end. The first end of the inlet pipe 21 is in communication with the inlet of the tank body 1. For example, in an embodiment of FIG. 2, a connection pipe 13 may be disposed at the inlet, and the first end of the inlet pipe 21 is connected with the connection pipe 13 to communicate with the inlet. Alternatively, the first end of the inlet pipe 21 is detachably connected with the tank body 1. Thus, it is convenient to assemble or disassemble the water pressing assembly 2.

Specifically, the inlet pipe 21 includes a first pipe section and a second pipe section. The first end of the inlet pipe 21 extends in a direction away from the inlet to form the first pipe section, and a free end of the first pipe section extends towards a bottom of the body to form the second pipe section. The first pipe section and the second pipe section are preferably connected in a rounded-off manner, so as to reduce resistance against the airstream flowing in the inlet pipe 21.

Alternatively, a limiting ring 211 is provided to the first pipe section of the inlet pipe 21 and adjacent to the first end of the inlet pipe 21, and surrounds an outer circumferential wall of the inlet pipe 21, to restrict a movement of the water pressing assembly 2 in a direction towards the exterior of the tank body 1 and thus stabilize the position of the water pressing assembly 2.

The water pressing plate 22 is formed with a water pressing hole 221 penetrating the water pressing plate 22. For example, the water pressing plate 22 is disposed horizontally with respect to a bottom wall of the tank body 1, the water pressing hole 221 is formed in the center of the water pressing plate 22, and the second end of the inlet pipe 21 is connected with an upper surface of the water pressing plate 22 and communicates with the water pressing hole 221, so as to suppress sprays at the water pressing hole 221, reduce the flow velocity of the airstream, and increase the contact time between the airstream and the water to fully mix the dirt with the water. Alternatively, the water pressing plate 22 and the second end of the inlet pipe 21 are integrally molded, such that the machining is simple and convenient.

Further, the water pressing assembly 2 further includes at least one vane 23 connected to a lower surface of the water pressing plate 22. One or more vanes 23 may be provided to the lower surface of the water pressing plate 22. For example, in the embodiment of FIGS. 2 and 3, a plurality of vanes 23 is provided and spaced apart from one another in a circumferential direction of the water pressing hole 221. Thus, when the airstreams flows out from the water pressing hole 221, the airstream may make circumferential motion under the action of the vanes 23, so as to reduce the flow velocity of the airstream to fully mix the dirt with the water and improve the filtration efficiency.

Alternatively, the plurality of vanes 23 are evenly spaced in the circumferential direction of the water pressing hole 221. Thus, the flow velocity of the airstream is uniform, thereby further improving the effect of mixing the dirt with the water.

In some embodiments of the present invention, a distance between two adjacent vanes 23 increases gradually from the inside out with respect to a center of the water pressing hole 221, and a plurality of diverging flow channels are formed in a circumferential direction of the water pressing plate 22. Thus, the flow velocity of the airstream may be further reduced. For example, in an embodiment of FIG. 3, the vane 23 is configured as a smooth curved surface, and extends from the inside out with respect to the center of the water pressing hole 221, which is simple in structure and convenient for machining, but is not limited thereto.

Specifically, the vane 23 is disposed in a non-parallel manner with respect to the water pressing plate 22. For example, in an embodiment of FIG. 2, the vane 23 is disposed in perpendicular to the water pressing plate 22.

It may be understood that the number and shape of the vane 23 may be adjusted adaptively according to the actual specification and size of the filtration liquid tank 100, which will not be defined specifically herein.

Figure 6:
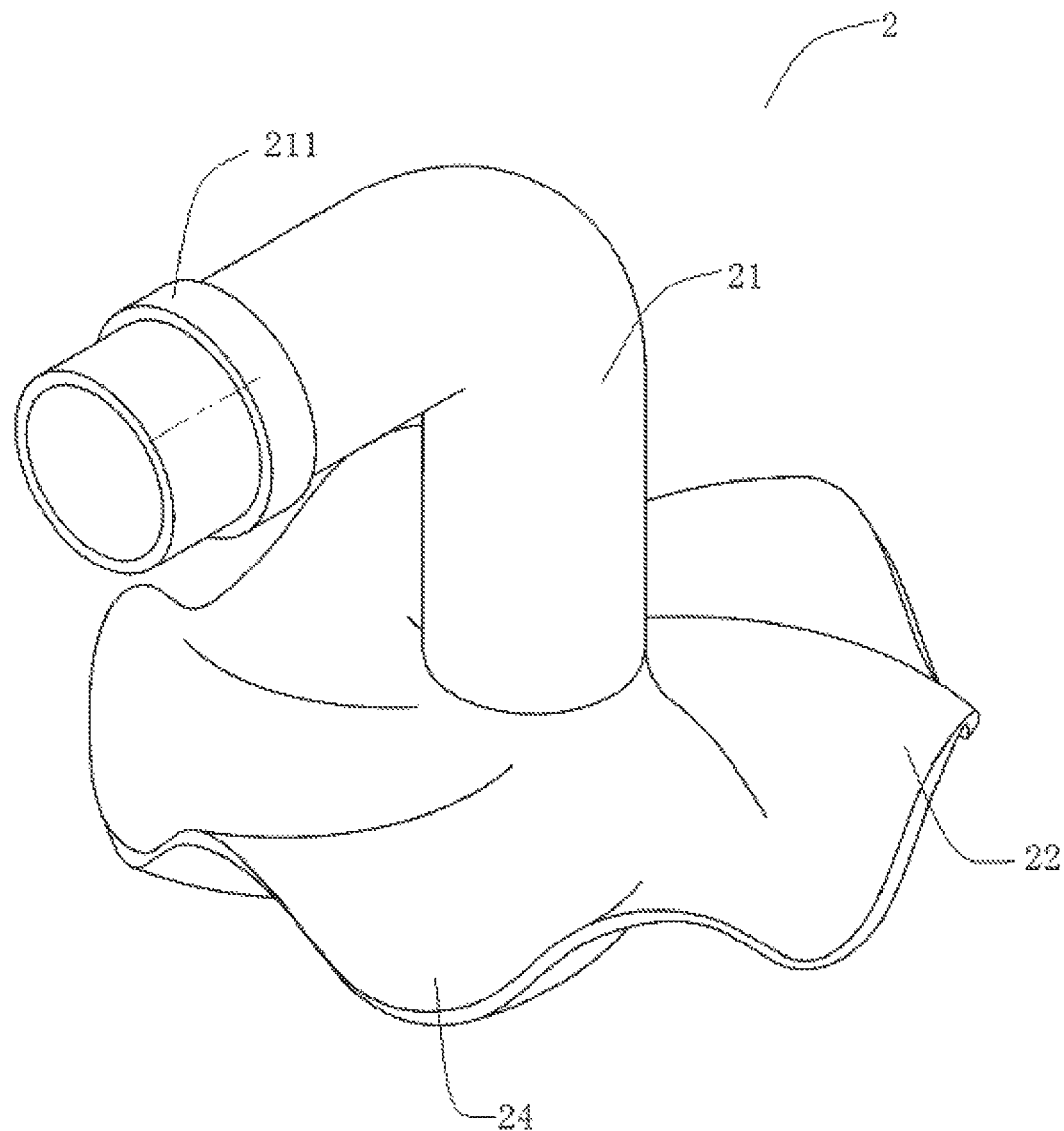
FIG. 6 is a perspective view of a water pressing assembly according to another embodiment of the present invention.

In some other embodiments of the present invention, referring to FIG. 6, the lower surface of the water pressing plate 22 is formed with a plurality of ditch-shaped water pressing troughs 24 radiating from the water pressing hole to the surrounding and extending curvedly, such that the water pressing plate 22 is formed as a trumpet-like structure on the whole. That is, the lower surface of the water pressing plate 22 may be provided with one or more water pressing troughs 24. For example, in an embodiment of FIG. 6, a plurality of water pressing troughs 24 is provided and spaced apart from one another in the circumferential direction of the water pressing hole 221. Thus, when the airstreams flows out from the water pressing hole 221, the airstream may make circumferential motion under the action of the water pressing troughs 24, so as to reduce the flow velocity of the airstream to fully mix the dirt with the water and improve the filtration efficiency.

Specifically, the plurality of water pressing troughs 24 is evenly spaced in the circumferential direction of the water pressing hole 221. Thus, the flow velocity of the airstream is uniform, thereby further improving the effect of mixing the dirt with the water.

In some embodiments of the present invention, width of each water pressing trough 24 increases gradually from the inside out with respect to the center of the water pressing hole 221. Thus, a plurality of diverging flow channels may be formed in the circumferential direction of the water pressing plate 22, so as to make the airstream move circumferentially and reduce the flow velocity of the airstream.

Further, in the embodiment of FIG. 6, an extension direction of each water pressing trough 24 deviates from a radial direction of the water pressing hole 221 from the inside out, and the water pressing plate 22 is formed as the trumpet-like structure on the whole. The water pressing trough 24 may deviate from the radial direction of the water pressing hole 221 along a clockwise direction or along a counterclockwise direction. Thus, it is possible to further improve the effect of mixing the dirt with the water.

It may be understood that the number and shape of the water pressing trough 24 may be adjusted adaptively according to the actual specification and size of the filtration liquid tank 100, which will not be defined specifically herein.

Additionally, the water pressing plate 22 may be provided with other structures capable of forming the diverging flow channels in the circumferential direction of the water pressing plate 22, as long as the airstream at the water pressing hole 221 achieves the circumferential motion.

Specifically, the cyclone separator 3 is configured in such a manner that the airstream entering the cyclone separation chamber through the cyclone inlet 31 rotates in the same direction as the rotation of the airstream flowing through the water pressing assembly 2. For example, in the embodiment of FIG. 2, the airstream flowing out of the vane of the water pressing plate 22 rotates clockwise, and then the airstream entering the cyclone separator 3 also rotates clockwise; likewise, the airstream flowing out of the vane of the water pressing plate 22 rotates counterclockwise, and then the airstream entering the cyclone separator 3 rotates counterclockwise as well. Thus, it is possible to make the overall flow in the tank body 1 smoother, thereby reducing the flow resistance of the airstream effectively.

It should be noted herein that the airstream flowing through the water pressing assembly 2 is the original airstream entering the filtration liquid tank 100 and having entrained dirt, while the airstream entering the cyclone separation chamber refers to the clean airstream with few droplets after the original airstream is mixed with the filtration medium in the filtration liquid tank and the dirt is separated.

In some embodiments of the present invention, at least part of the cyclone separation chamber is configured as a structure with a sectional area decreasing gradually from the top down. Specifically, an upper part of the cyclone separation chamber may be configured as the structure with the sectional area decreasing gradually from the top down, or a lower part thereof may be configured as the structure with the sectional area decreasing gradually from the top down, or the entire cyclone separation chamber may be configured as the structure with the sectional area decreasing gradually from the top down. For example, referring to FIG. 5, the lower part of the cyclone separation chamber has the sectional area decreasing gradually from the top down.

Further, a communicating port 32 is formed in a bottom of the cyclone separator 3 and penetrates it, and a float 4 is provided in the cyclone separator 3 to close the communicating port 32 in a normally closed state. Alternatively, the size of the communicating port 32 is smaller than that of the float 4. For example, referring to FIG. 2, in combination with FIG. 5, the shape of the float 4 is spherical, the shape of the communicating port 32 is circular, and the communicating port 32 has a diameter smaller than the float 4. Thus, the float 4 may be caught in the communicating port 32 to prevent the float 4 from slip out of the cyclone separator 3, and may be utilized to block the water splashed from the bottom of the tank body 1.

It may be understood that a limiting rib 54, for example, a cross-shaped limiting rib 54, may be provided at the communicating port 32 to prevent the float 4 from slip out of the cyclone separator 3, which will not be defined particularly herein.

Specifically, the first end (e.g. the lower end in FIG. 2) of the outlet pipe 12 extends into the cyclone separation chamber, and the float 4 is suitable to close the first end of the outlet pipe 12 (i.e. the lower end of the outlet pipe 12) when the float 4 opens the communicating port 32. Thus, when a certain amount of dirt is sucked into the tank body 1, the water level in the tank body 1 rises, and the float 4 rises under the action of buoyancy to block the lower end of the outlet pipe 12, which makes the dedusting device shut down and gives an alarm, thereby ensuring safe operation of the dedusting device. Additionally, when the water in the cyclone separator 3 accumulates to a certain amount, the float 4 rises under the action of suction and buoyancy to make the accumulated water flow out of the cyclone separator 3; after part of the water flows out of the cyclone separator 3, the float 4 is subject to re-balanced buoyancy and gravity, and the float 4 blocks the communicating port 32 again to ensure the separation effect of the cyclone separator 3.

Figure 5:
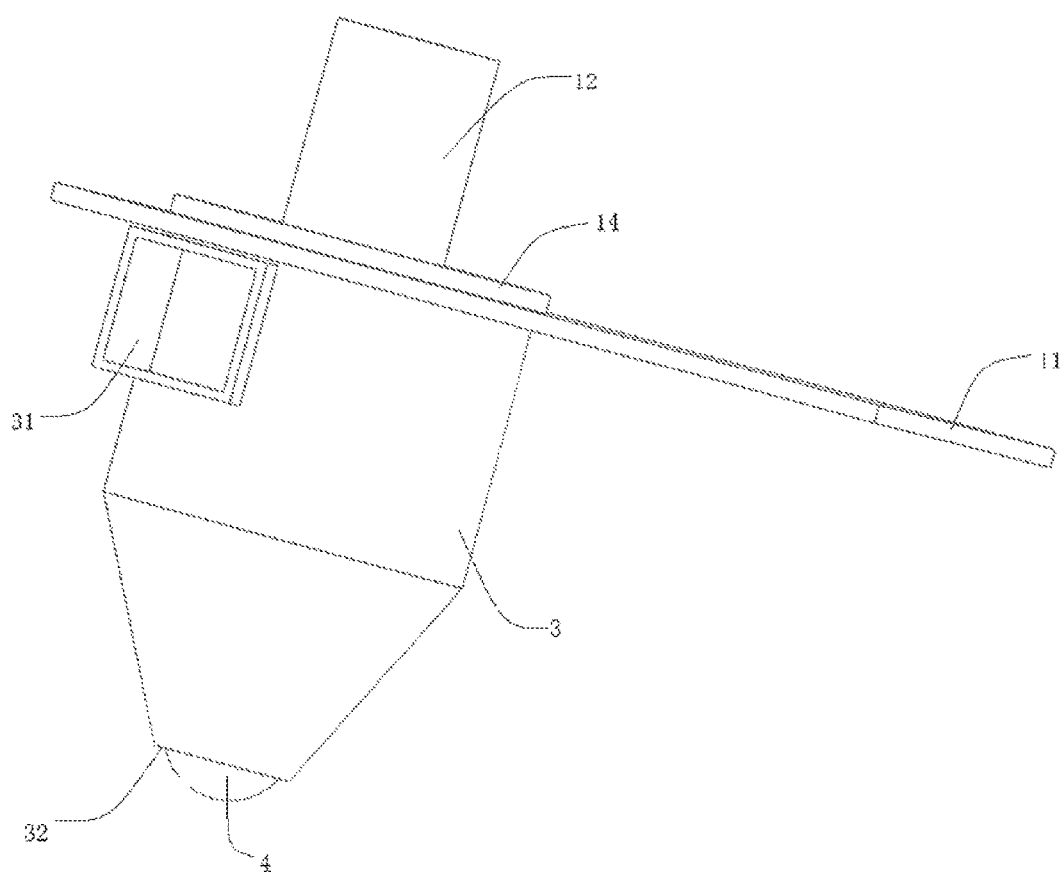
FIG. 5 is a schematic view of a cyclone separator shown in FIG. 2.

In some embodiments of the present invention, referring to FIG. 2, in combination with FIG. 5, the cyclone separation chamber has an open top; the tank body 1 further includes an outlet cover plate 14 disposed on the upper cover plate 11 and closing the top of the cyclone separation chamber, in which the outlet of the tank body 1 is formed in the outlet cover plate 14.

Specifically, the outlet cover plate 14 and the upper cover plate 11 are detachably connected, to facilitate the assembling and disassembling of the outlet cover plate 14 and hence the cleaning of the tank body 1. For example, the outlet cover plate 14 and the upper cover plate 11 are connected through a snap or a screw, which is not limited thereto. When the tank body 1 needs cleaning, it is only necessary to disassemble the outlet cover plate 14 from the upper cover plate 11, so as to clean the tank body 1, which is simple in structure and convenient for cleaning.

Two specific embodiments according to the present invention will be described with reference to FIGS. 1 to 6.

Embodiment 1

Referring to FIGS. 1 to 5, the filtration liquid tank 100 for the dedusting device includes the tank body 1, the water pressing assembly 2 and the cyclone separator 3.

The tank body 1 includes the body, the upper cover plate 11 and the outlet cover plate 14; the top of the body is open, the upper cover plate 11 is disposed at the top of the body, and the outlet cover plate 14 and the upper cover plate 11 are detachably connected. Thus, it is convenient to assemble or disassemble the outlet cover plate 14, and clean the tank body 1.

The tank body 1 is substantially configured as a rectangular shape. The tank body 1 is formed with the inlet and the outlet, the inlet is formed in the side wall of the body, and the outlet is formed in the outlet cover plate 14 of the tank body 1.

The outlet pipe 12 is provided at the outlet of the tank body 1, and has the first end (e.g. the lower end in FIG. 2) in communication with the interior of the tank body 1 and the second end (e.g. the upper end in FIG. 2) located outside the tank body 1 and in communication with the exterior of the tank body 1.

The water pressing assembly 2 includes the inlet pipe 21, the water pressing plate 22 and the plurality of vanes 23 disposed to the lower surface of the water pressing plate 22. Specifically, the inlet pipe 21 has the first end and the second end, the connection pipe 13 is disposed at the inlet, and the first end of the inlet pipe 21 is connected with the connection pipe 13 to communicate with the inlet. The first end of the inlet pipe 21 is detachably connected with the tank body 1. Thus, it is convenient to maintain and repair the water pressing assembly 2, which improves the maintainability of the water pressing assembly 2.

More specifically, the inlet pipe 21 further includes the first pipe section and the second pipe section. The first end of the inlet pipe 21 extends in the direction away from the inlet to form the first pipe section; the limiting ring 211 is provided to the first pipe section of the inlet pipe 21 and adjacent to the first end of the inlet pipe 21, and surrounds the outer circumferential wall of the inlet pipe 21; and the limiting ring 211 has a diameter greater than the inlet pipe 21. Thus, it is possible to restrict the movement of the water pressing assembly 2 in the direction towards the exterior of the tank body 1 and thus stabilize the position of the water pressing assembly 2. The free end of the first pipe section extends towards the bottom of the body to form the second pipe section. The first pipe section and the second pipe section are preferably connected in a rounded-off manner, so as to reduce the resistance against the airstream flowing in the inlet pipe 21.

The water pressing plate 22 and the second end of the inlet pipe 21 are integrally molded; the water pressing plate 22 is disposed horizontally, the upper surface of the water pressing plate 22 is connected with the second end of the inlet pipe 21; and the water pressing hole 221 is formed in the center of the water pressing plate 22 and communicates with the second end of the inlet pipe 21. Thus, it is possible to suppress sprays at the water outlet effectively, reduce the flow velocity of the airstream, and increase the contact time between the airstream and the water to fully mix the dirt with the water.

The plurality of vanes 23 are evenly spaced in the circumferential direction of the water pressing hole 221, and the distance between two adjacent vanes 23 increases gradually from the inside out with respect to the center of the water pressing hole 221. Specifically, each vane 23 extends curvedly from the inside out with respect to the center of the water pressing hole 221 to form the plurality of diverging flow channels in the circumferential direction of the water pressing plate 22. Thus, when the airstream flows out of the water pressing hole 221, the airstream may move circumferentially under the action of the vanes 23, so as to reduce the flow velocity of the airstream, increase the contact time between the dirt and the water to mix the dirt with the water fully and uniformly, and thus improve the filtration efficiency.

The cyclone separator 3 is disposed to the upper cover plate 11 of the tank body 1 and communicates with the outlet. Specifically, the cyclone separator 3 defines the cyclone separation chamber therein, the top of the cyclone separation chamber is open, and the outlet cover plate 14 of the tank body 1 is disposed on the upper cover plate 11 and closes the top of the cyclone separation chamber.

The cyclone inlet 31 is formed in the upper part of the cyclone separator 3, extends along a tangential direction of the cyclone separator 3, and communicates with the cyclone separation chamber. The airstream with entrained liquid enters the cyclone separation chamber through the cyclone inlet 31 to separate liquid from gas under the effect of gravity and centrifugal force, so as to improve the gas-liquid separation effect effectively.

The cyclone separator 3 is configured in such a manner that the airstream entering the cyclone separation chamber through the cyclone inlet 31 rotates in the same direction as the rotation of the airstream flowing through the water pressing assembly 2.

The lower part of the cyclone separation chamber has the sectional area decreasing gradually from the top down. The communicating port 32 is formed in the bottom of the cyclone separator 3 and penetrates the bottom of the cyclone separator 3, and a spherical float 4 is provided in the cyclone separator 3 to open or close the communicating port 32. The lower end of the outlet pipe 12 extends into the cyclone separation chamber, and the float 4 is suitable to close the lower end of the outlet pipe 12 when the float 4 opens the communicating port 32. The size of the communicating port 32 is smaller than that of the float 4. Thus, the float 4 may be caught in the communicating port 32 to prevent the float 4 from slip out of the cyclone separator 3, and may be utilized to block the water splashed from the bottom of the tank body 1. When a certain amount of dirt is sucked into the tank body 1, the water level in the tank body 1 rises, and the float 4 rises under the action of buoyancy to block the lower end of the outlet pipe 12, which makes the dedusting device shut down and gives an alarm, thereby ensuring safe operation of the dedusting device. Additionally, when the water in the cyclone separator 3 accumulates to a certain amount, the float 4 rises under the action of suction and buoyancy to make the accumulated water flow out of the cyclone separator 3; after part of the water flows out of the cyclone separator 3, the float 4 is subject to re-balanced buoyancy and gravity, and the float 4 blocks the communicating port 32 again to ensure the separation effect of the cyclone separator 3.

For example, the airstream with entrained dirt enters the tank body 1 via the inlet of the tank body 1, goes through the water pressing assembly 2, and makes the circumferential motion when flowing out of the water pressing assembly 2, which reduces the flow velocity, increases the contact time between the dirt in the airstream and the water in the tank body 1 to fully mix the dirt with the water, and thus realizes the preliminary separation. Then, the airstream with entrained liquid after the preliminary separation enters the cyclone separation chamber through the cyclone inlet 31 of the cyclone separator 3 to undergo further gas-liquid separation under the effect of centrifugal force and gravity, and the separated gas is transported to the outlet and exhausted from it.

Embodiment 2

As shown in FIG. 6, this embodiment is substantially identical to first embodiment in structure, in which same members employ same reference numerals; the difference lies in that the plurality of spaced vanes 23 is provided to the lower surface of the water pressing plate 22 of the water pressing assembly 2, but in this embodiment, the plurality of spaced water pressing troughs 24 is provided to the lower surface of the water pressing plate 22. The separator in the first embodiment is the cyclone separator 3, while the separator in this embodiment is a gas-liquid separator 5.

Referring to FIG. 6, the plurality of water pressing troughs 24 are provided and spaced evenly in the circumferential direction of the water pressing hole 221, and the width of each water pressing trough 24 increases gradually from the inside out with respect to the center of the water pressing hole 221. Specifically, each water pressing trough 24 deviates from the radial direction of the water pressing hole 221 from the inside out in the clockwise direction, to form the plurality of diverging flow channels in the circumferential direction of the water pressing plate 22. Thus, when the airstream flows out of the water pressing hole 221, the airstream may move circumferentially under the action of the water pressing troughs 24, so as to reduce the flow velocity of the airstream gradually to mix the dirt with the water fully and uniformly and thus improve the filtration efficiency.

For the filtration liquid tank 100 according to embodiments of the present invention, by disposing, within the filtration liquid tank 100, the water pressing assembly 2 capable of making the airstream entering the tank body 1 produce the circumferential motion, the airstream with entrained dirt may be mixed with the water in the tank body 1. Thus, it is possible to reduce the flow velocity of the airstream, increase the contact time between the airstream and the water to fully mix the dirt with the water and improve the mixing effect of dirt and water, and enhance the filtration efficiency. Additionally, the cyclone separator 3 is disposed at the outlet of the tank body 1 to further improve the gas-liquid separation effect and hence guarantee the safe operation of the dedusting device.

The dedusting device (not shown) according to the second aspect of embodiments of the present invention includes the filtration liquid tank 100 according to the first aspect of embodiments of the present invention.

For the dedusting device according to embodiments of the present invention, by providing the filtration liquid tank 100 according to the first aspect of embodiments of the present invention, the overall performance of the dedusting device is improved.

Reference throughout this specification to "an embodiment," "some embodiments," "an example," "specific examples" or "some examples" means that a particular feature, structure, material, or characteristic described in connection with the embodiment or example is included in at least one embodiment or example of the present invention. Thus, the appearances of the above phrases throughout this specification are not necessarily referring to the same embodiment or example of the present invention. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present invention have been shown and illustrated, it shall be understood by those skilled in the art that various changes, modifications, alternatives and variants without departing from the principle and spirit of the present invention are acceptable. The scope of the present invention is defined by the claims or the like.

What is claimed is:

1. A filtration liquid tank for a dedusting device, comprising:
   a tank body having an inlet and an outlet;
   a cyclone separator disposed within the tank body and in communication with the outlet of the tank body, defining a cyclone separation chamber therein, and formed with a cyclone inlet in communication with the cyclone separation chamber; and
   a water pressing assembly disposed within the tank body and in communication with the inlet of the tank body, and configured to guide an airstream entering from the inlet towards a filtration medium and produce a circumferential motion, the airstream filtered by the filtration medium being exhausted from the outlet,
   wherein a communicating port is formed in a bottom of the cyclone separator and penetrates the bottom of the cyclone separator, and a float is provided in the cyclone separator to close the communicating port in a normally closed state.

2. The filtration liquid tank according to claim 1, wherein the cyclone separator is configured in such a manner that the airstream entering the cyclone separation chamber through the cyclone inlet rotates in the same direction as the rotation of the airstream flowing through the water pressing assembly.

3. The filtration liquid tank according to claim 1, wherein the water pressing assembly comprises an inlet pipe and a water pressing plate; the inlet pipe has a first end in communication with the inlet and a second end; the water pressing plate is formed with a water pressing hole penetrating the water pressing plate; and the second end of the inlet pipe is connected with an upper surface of the water pressing plate and communicates with the water pressing hole.

4. The filtration liquid tank according to claim 3, wherein the water pressing assembly further comprises at least one vane connected to a lower surface of the water pressing plate.

5. The filtration liquid tank according to claim 4, wherein the vane is configured as a smooth curved surface, and extends from the inside out with respect to a center of the water pressing hole.

6. The filtration liquid tank according to claim 4, wherein a plurality of vanes are provided and spaced apart from one another in a circumferential direction of the water pressing hole.

7. The filtration liquid tank according to claim 6, wherein a distance between two adjacent vanes increases gradually from the inside out with respect to the center of the water pressing hole.

8. The filtration liquid tank according to claim 4, wherein the vane is disposed in a non-parallel manner with respect to the water pressing plate.

9. The filtration liquid tank according to claim 3, wherein the water pressing plate is formed with a plurality of ditch-shaped water pressing troughs radiating from the water pressing hole to the surrounding and extending curvedly.

10. The filtration liquid tank according to claim 9, wherein the plurality of water pressing troughs are spaced apart from one another in the circumferential direction of the water pressing hole.

11. The filtration liquid tank according to claim 9, wherein width of each water pressing trough increases gradually from the inside out with respect to the center of the water pressing hole.

12. The filtration liquid tank according to claim 9, wherein an extension direction of each water pressing trough deviates from a radial direction of the water pressing hole from the inside out.

13. The filtration liquid tank according to claim 1, wherein the cyclone inlet extends tangentially along a side wall of the cyclone separator.

14. The filtration liquid tank according to claim 13, wherein the cyclone inlet is formed in an upper part of the cyclone separator.

15. The filtration liquid tank according to claim 14, wherein at least part of the cyclone separation chamber is configured as a structure with a sectional area decreasing gradually from the top down.

16. The filtration liquid tank according to claim 15, wherein the at least part of the cyclone separation chamber is a lower part of the cyclone separator.

17. The filtration liquid tank according to claim 1, wherein an outlet pipe is provided at the outlet, an end of the outlet pipe extends into the cyclone separation chamber, and the float is suitable to close the end of the outlet pipe when the float opens the communicating port.

18. The filtration liquid tank according to claim 1, wherein the tank body comprises:
   a body having an open top, and
   an upper cover plate disposed on the top of the body, the cyclone separator being disposed to the upper cover plate.

19. The filtration liquid tank according to claim 18, wherein a top of the cyclone separation chamber is open, and the tank body further comprises an outlet cover plate disposed on the upper cover plate and closing the top of the cyclone separation chamber, in which the outlet is formed in the outlet cover plate, and the outlet cover plate and the upper cover plate are detachably connected.

20. A dedusting device comprising a filtration liquid tank comprising:
   a tank body having an inlet and an outlet;
   a cyclone separator disposed within the tank body and in communication with the outlet of the tank body, defining a cyclone separation chamber therein, and formed with a cyclone inlet in communication with the cyclone separation chamber; and
   a water pressing assembly disposed within the tank body and in communication with the inlet of the tank body, and configured to guide an airstream entering from the inlet towards a filtration medium and produce a circumferential motion, the airstream filtered by the filtration medium being exhausted from the outlet,
   wherein a communicating port is formed in a bottom of the cyclone separator and penetrates the bottom of the cyclone separator, and a float is provided in the cyclone separator to close the communicating port in a normally closed state.

* * * * *